(12) United States Patent
Duncan et al.

(10) Patent No.: US 7,398,811 B1
(45) Date of Patent: Jul. 15, 2008

(54) TUBULAR LABEL SPREADER WITH TRANSFER APPARATUS

(75) Inventors: Adam Whitaker Duncan, Clayton, NC (US); Alen Subasic, Holly Springs, NC (US)

(73) Assignee: Axon LLC, Raleigh, NC (US)

( * ) Notice: Subject to any disclaimer, the term of this patent is extended or adjusted under 35 U.S.C. 154(b) by 97 days.

(21) Appl. No.: 11/137,184

(22) Filed: May 25, 2005

(51) Int. Cl.
*B65H 81/02* (2006.01)
*B65C 3/14* (2006.01)
*B32B 37/16* (2006.01)
*B32B 37/30* (2006.01)
*B29C 65/48* (2006.01)
*B29C 65/56* (2006.01)

(52) U.S. Cl. .................. 156/392; 156/86; 156/215; 156/443; 156/538; 156/DIG. 9; 53/397; 53/398; 53/585

(58) Field of Classification Search .............. 156/86, 156/215, 230, 392, 443, 538, DIG. 5–DIG. 11; 53/49, 137.1, 295–297, 397–398, 585
See application file for complete search history.

(56) References Cited

U.S. PATENT DOCUMENTS

| | | | | |
|---|---|---|---|---|
| 4,208,857 A | * | 6/1980 | Fujio | 53/585 |
| 4,412,876 A | * | 11/1983 | Lerner et al. | 156/64 |
| 4,565,592 A | * | 1/1986 | Wehrmann et al. | 156/64 |
| 4,574,027 A | * | 3/1986 | Weinundbrot | 156/352 |
| 4,806,187 A | * | 2/1989 | Fujisawa | 156/86 |
| 5,715,651 A | * | 2/1998 | Thebault | 53/399 |
| 5,759,337 A | * | 6/1998 | Fujio et al. | 156/443 |
| 6,070,399 A | * | 6/2000 | Huang et al. | 53/585 |
| 2006/0090624 A1 | * | 5/2006 | Chen | 83/651 |

FOREIGN PATENT DOCUMENTS

EP 0366267 A1 * 5/1990

* cited by examiner

*Primary Examiner*—Philip C Tucker
*Assistant Examiner*—Sonya Mazumdar
(74) *Attorney, Agent, or Firm*—Thompson Hine LLP

(57) ABSTRACT

Apparatus for guiding an opened tubular label from a tube spreader onto a cylindrical object, e.g. a product cylindrical container, being conveyed past the spreader in a manufacturing environment. The spreader is adapted with an array of wires forming a skirt from the lower surface of the spreader to the top of the cylindrical container. The wires are short at the upstream edge of the spreader to not contact the upper surface of the cylindrical container, and long at the downstream edge of the spreader to contact the upper surface of the cylindrical container.

18 Claims, 7 Drawing Sheets

TUBULAR LABEL SPREADER WITH TRANSFER APPARATUS

FIELD OF THE INVENTION

The present invention relates to the field of apparatus and methods for the application of tubular labels to product containers, and more particularly to such apparatus and methods adapted for use with product containers that are cylindrical in shape.

BACKGROUND OF THE INVENTION

The application of tubular labels to product containers to enhance the appearance and add information is known and popular. Tubular labels for use on containers are typically supplied in flat condition. The flat tube is opened by being passed over a spreader, with the opened tube somewhat elliptical in cross section. In the known technology, the product containers are restricted to those having a relatively narrow upper portion compared to a relatively wide lower portion, e.g. a bottle. The present invention recognizes that it is desirable to apply such tubular labels to cylindrical containers that have a substantially uniform cross sectional area throughout their axial length, e.g. cans and jars, as well as to bottles. Cylindrical containers present a greater challenge to the application of tubular labels, especially tubular labels that are formed from flattened tubular material because the upper portion of the container is of full diameter.

Tubular labels are generally formed from an extruded plastic sheet material in order to shrink the label after placing it around the container. The label is initially formed from a flat sheet of plastic, and the label is made tubular by welding the opposed edges together. The formed tube is then flattened and rolled onto a core for further handling. The flattened tube retains creases at its edges. At the time of applying the tubular label to a container, the tube is opened by being passed over a spreader, and slipped over the container. The opened tube has a non-round cross sectional shape due to the initial flat condition of the tube and the creases. When the opened tube is moved off the spreader, the tube tends to become somewhat elliptical. In the case of a bottle, the lack of tube roundness does not significantly impair placing the tube over the container since the small bottle top is an easier target. However, in the case of a cylindrical container, the container top is of full diameter and the application of a non-round tubular label is more difficult. In an industrial environment in which large numbers of labels are to be put onto containers each minute, the difficulty is exacerbated.

SUMMARY OF THE INVENTION

The present invention provides a novel tube spreader for use in a tubular label applicator machine to enable placing the tubular label, or sleeve, onto a cylindrical container. A set of transfer wires are dispersed around the lower periphery of the spreader in the form of a skirt. The skirt of wires bridges the space from the bottom of the spreader to the top periphery of the container to maintain the cut sleeve in essentially round configuration to slip over the container. In a preferred embodiment, transfer wires at the sides and downstream end of the spreader are long enough to contact the cylindrical side surface of the container, and transfer wires at the upstream end of the spreader are shorter so as to allow the container to pass without contact. The sleeve is pushed onto the container and the container continues to travel downstream, the transfer wires bend and continue to guide the sleeve onto the container as the container moves along its path.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
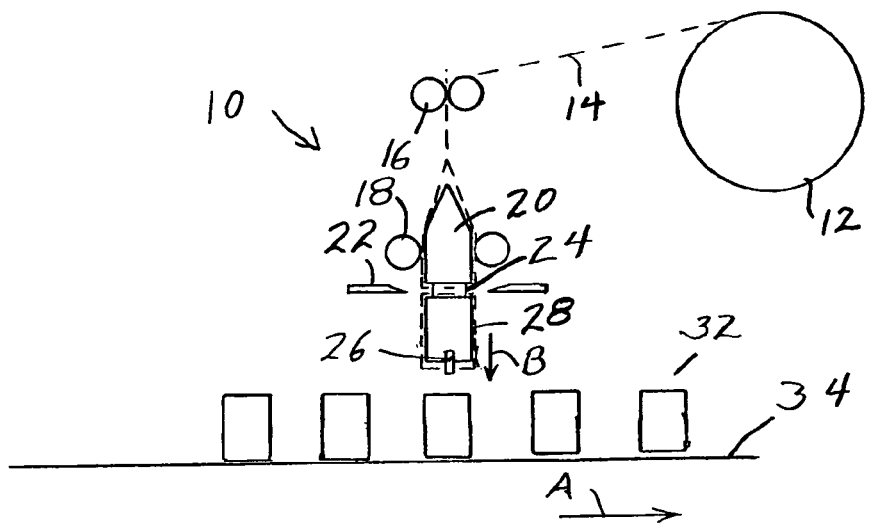
FIG. 1 is a diagrammatic side view of a tubular label application apparatus of the prior art.
Figure 2A:
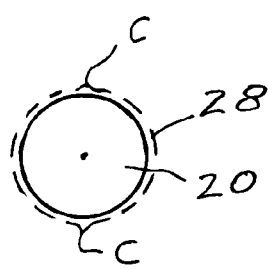
FIG. 2A is a top plan view of a tubular label in fully opened condition on a spreader of the prior art.
Figure 2B:
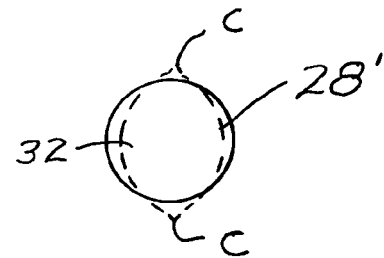
FIG. 2B is a top plan view of the tubular label being transferred from the spreader of FIG. 2A of the prior art to a cylindrical product.

FIGS. 1, 2A and 2B depict sleeve transfer apparatus of the prior art. Referring now to FIG. 1, a tubular label applicator 10 receives flat tubular material 14 from a supply roll 12, tubular material 14 being shown in dashed lines for clarity. Tubular material drivers 16 operate intermittently to draw flat tubular material 14 from supply roll 12 to be passed onto spreader 20. Spreader 20 has a conical top and a cylindrical lower portion. A pair of sleeve drivers 18 operate in coordination with tubular material drivers 16 to move tubular material 14 onto and along spreader 20. Typically, tubular material 14 is moved by sleeve drivers 18 to a position at which the lower end of tubular material 14 is substantially adjacent to the lower end of spreader 20, and spreader 20 is maintained in close proximity to the top of a series of containers 32. When sleeve drivers 18 stop moving tubular material 14 downwardly along spreader 20, a cutter 22 rotates into a groove 24 in spreader 20 to sever a cut sleeve 28 from tubular material 14. Cut sleeve 28 is long enough to cover the desired surface area of a container 32.

Continuing with reference to FIG. 1, containers 32 are being conveyed on a conveyor belt 34 in the direction indicated by arrow A. As described above, cut sleeve 28 is pushed off spreader 20 by a pair of sleeve drivers 26 in the direction indicated by arrow B to be placed onto a container 32. In this described process, cut sleeve 28 is moved in a first direction to be mounted onto a container 32 that is moving in a second direction, the second direction being perpendicular to the first direction. When the container is a bottle, i.e. a container with a narrow top, mounting a tubular label is relatively easy. However, when the container is a can or a jar, the application of a tubular label is more difficult. To overcome this difficulty, either the downward movement of the cut sleeve must be significantly faster than the forward movement of the container, or the conveyor must stop while the cut sleeve is mounted onto each container. Otherwise, a major segment of cut sleeve 28 will be entrained on spreader 20 as a minor segment of cut sleeve 28 is moved in the direction of arrow A with container 32, causing significant distortion or tearing of cut sleeve 28. In addition, spreader 20 must be close to container 32 to prevent cut sleeve 28 from resuming an elliptical cross section when not supported in round shape by spreader 20.

An alternate method to overcome the difficulty of passing cut sleeve 28 downward onto a moving cylindrical container 32 is to increase the space between spreader 20 and container 32. With a greater space, a small upper segment of cut sleeve 28 remains in contact with spreader 20 as a small lower segment of cut sleeve 28 is mounted onto container 32 to reduce distortion. Referring now to FIG. 2A, cut sleeve 28 is shown residing on spreader 20 prior to being moved downward to engage a container. Cut sleeve 28 is somewhat round and retains a pair of opposed creases C that were formed by being stored in flat condition on supply roll 12 (see FIG. 1). Referring now to FIG. 2B, as cut sleeve 28 is moved downward across a space between spreader 20 and container 32 (see FIG. 1), cut sleeve 28' naturally relaxes toward its original flat contour to form a substantially elliptical cross sectional shape with creases C appearing somewhat more defined. In this elliptical shape, cut sleeve 28' is too narrow to be mounted onto a cylindrical container 32.

With production speeds in modern manufacturing environments of hundreds of containers labeled per minute, neither of the choices of moving the label significantly faster than the speed of the container conveying speed, or stopping the container conveyor while the tubular label is mounted, is acceptable. Similarly, the problem of the opened cut sleeve label tending to relax toward its initial flat condition eliminates the alternate option of increased space between the spreader and the container.

Figure 3:
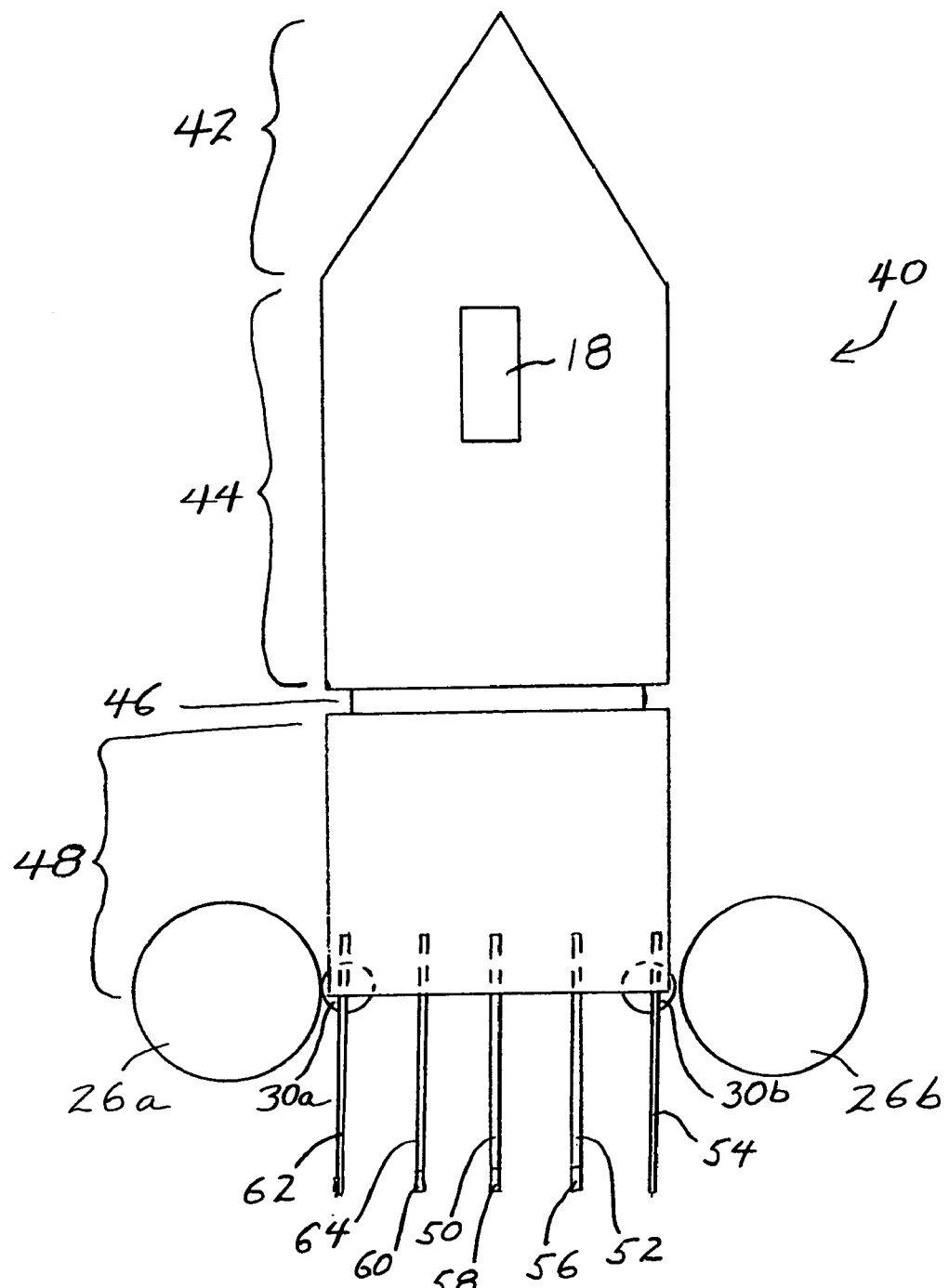
FIG. 3 is a diagrammatic front view of a tubular label spreader according to the present invention.

Referring now to FIG. 3, a front elevation view of a spreader 40 of the present invention is illustrated with no tubular material. Spreader 40 is depicted as having a conical top segment 42 over which flat tubular label material (see FIG. 1) is opened. Conical top segment 42 may include a transverse plate (not shown) to assist entry into the flat tube and maintain alignment. The center of spreader 40 is a cylindrical segment 44 that is sized to open the tubular label material to a desired diameter sufficient to mount on a container to be labeled. The lower portion of spreader 40 is a cylindrical segment 48 that is separated from central cylindrical segment 44 by a groove 46. Groove 46 allows a cutter as is known to cut the tubular label material to the proper length for the container to be covered. A pair of sleeve drivers 18 (only one shown in this view) serve to move an appropriate length of tubular material from the supply roll. A pair of bearings 30a and 30b are assembled to and extend slightly beyond the diameter of lower cylindrical segment 48 to support spreader 40 on sleeve drivers 26a and 26b. Sleeve drivers 26a and 26b also serve to move a cut sleeve from spreader 40 onto a container being labeled.

Continuing in reference to FIG. 3, a skirt is formed of a number of substantially thin transfer members 50-64, for example resilient wires, that extend parallel to the circumferential surface of lower cylindrical segment 48 at approximately the same diameter. It is seen that forward transfer members 50, 52 and 64 are shorter in length than side and rear transfer members 54-62 for reasons discussed below. Transfer members 50-64 are shown as wires having a round cross section according to the preferred embodiment; other shapes, for example rectangular, are understood to be within the scope of the present invention. The wires forming transfer members 50-64 are made of alloy steel, commonly known as spring wire or music wire, to provide a resilient support skirt for cut sleeves being transferred thereby. The diameter or cross section of transfer members 50-64 is left to the discretion of the designer.

Figure 4:
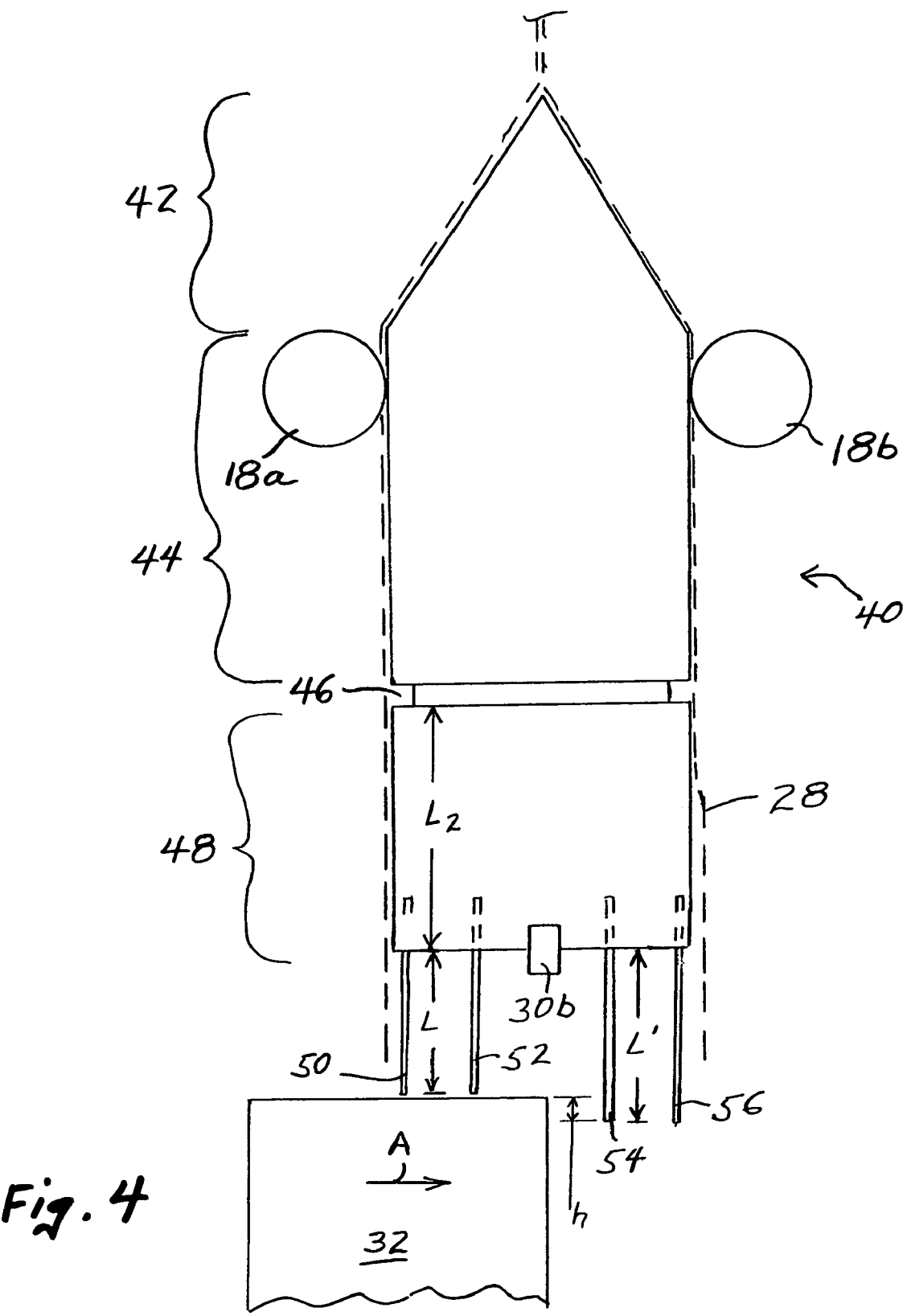
FIG. 4 is a diagrammatic side view of the tubular label spreader of FIG. 3 with a cylindrical product approaching a label mounting position.
Figure 5:
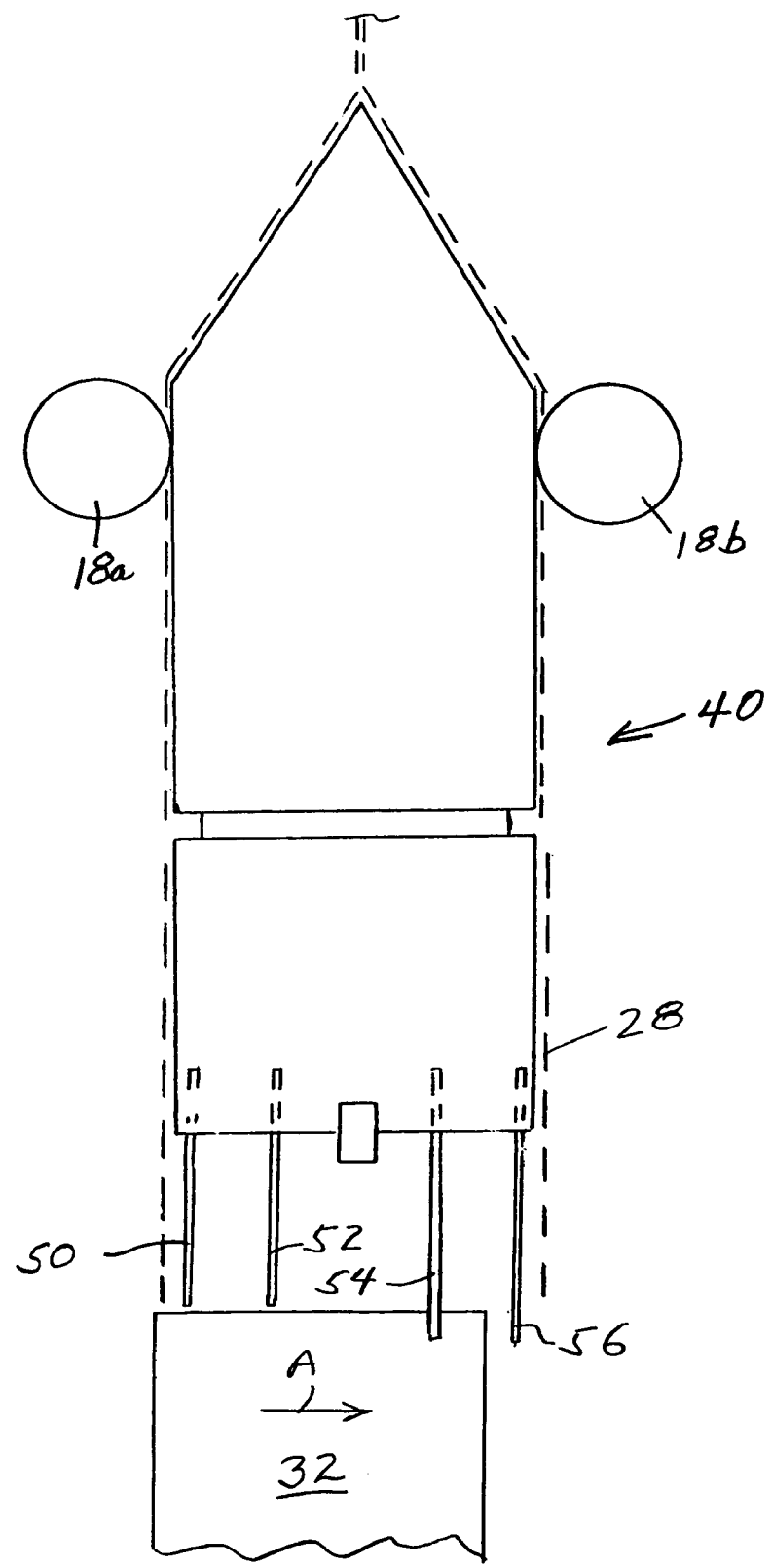
FIG. 5 is a diagrammatic side view of the tubular label spreader of FIG. 4 with the cylindrical product approaching and a tubular label being moved toward the product.
Figure 6:
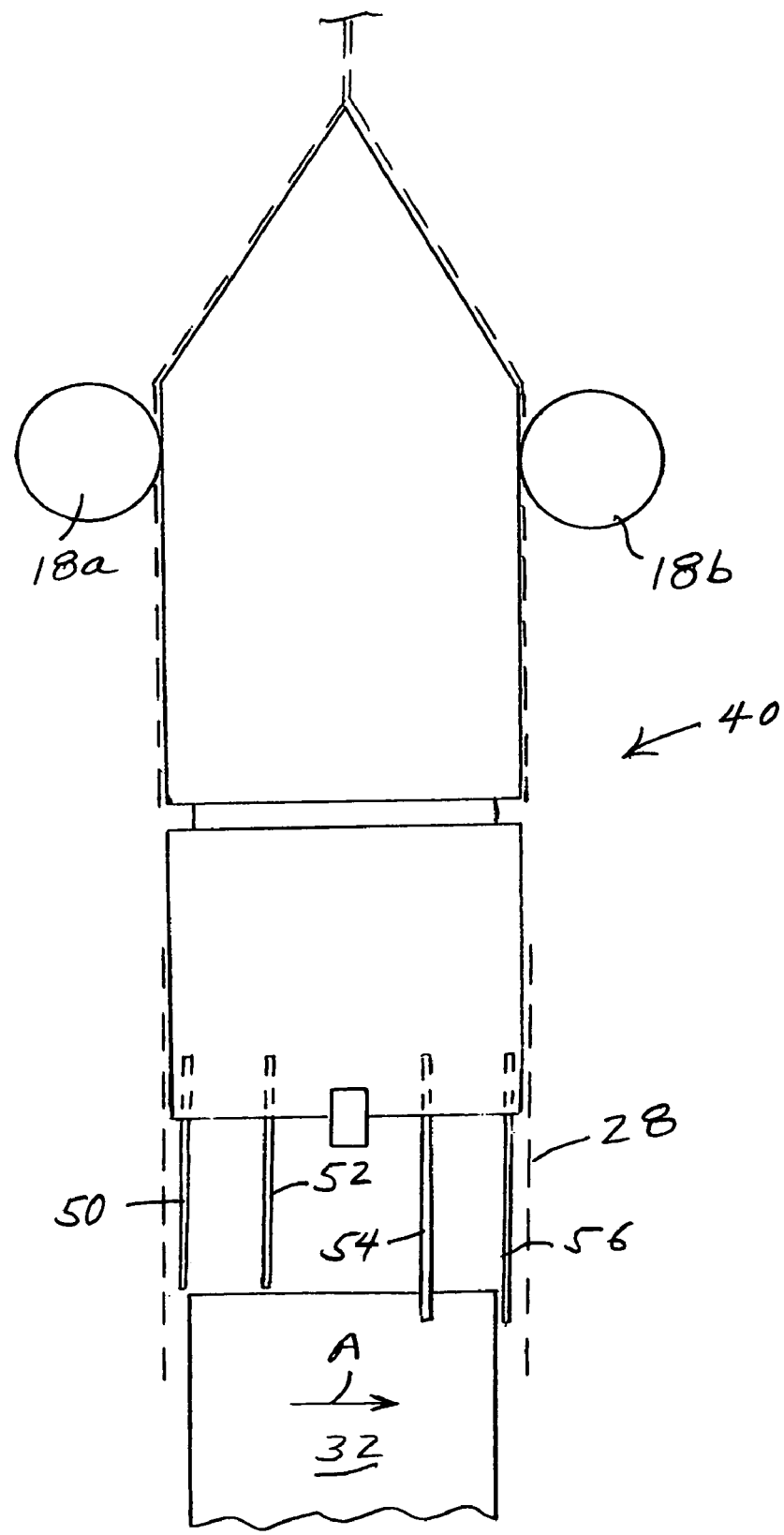
FIG. 6 is a diagrammatic side view of the tubular label spreader of FIG. 5 with the cylindrical product in label mounting position and the label partially mounted thereon.
Figure 7:
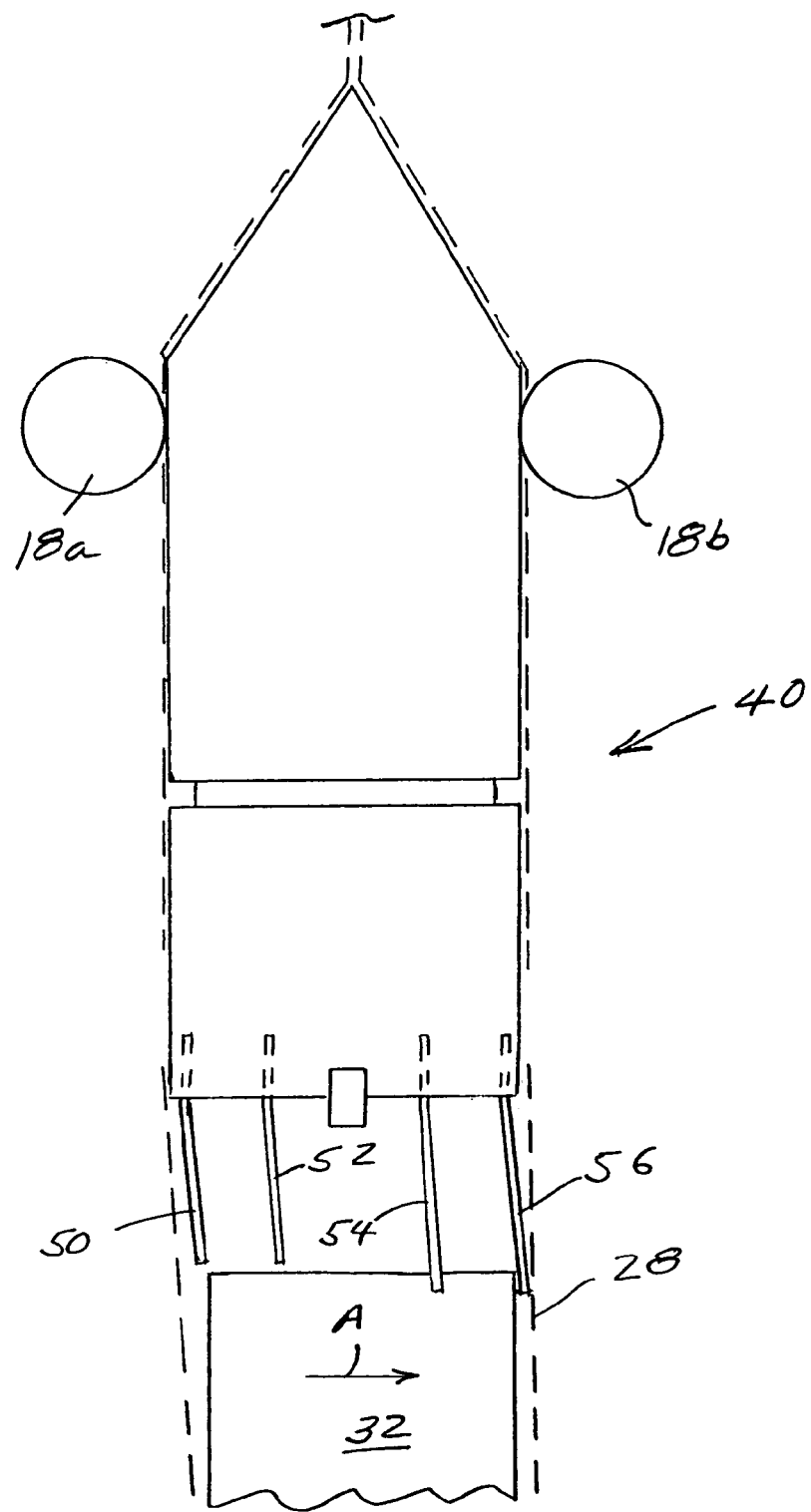
FIG. 7 is a diagrammatic side view of the tubular label spreader of FIG. 6 with the cylindrical product moving past the label mounting position and carrying the partly mounted label forward.

Referring now to FIG. 4, spreader 40 is shown in side elevation view as suspended above a cylindrical container 32 that is being conveyed in the direction indicated by arrow A. Spreader 40 is held at a height with shorter transfer members 50 and 52, having a length L, not contacting the top surface of cylindrical container 32, and longer transfer members 54 and 56, having a length L', overlapping the upper surface of cylindrical container 32 as container 32 is moved past. According to the preferred embodiment, longer transfer members 54 and 56 extend a distance h past the upper surface of container 32 equal to about 3.0 mm (⅛ inch). Furthermore, it is preferred that length L of shorter transfer members 50 and 52 plus the length $L_2$ of lower cylinder 48 is equal to, or less than, the length of cut sleeve 28. In the condition illustrated in FIG. 4, cut sleeve 28 is spaced above cylindrical container 32, and cylindrical container 32 is advanced to the point that its forward end is about at the mid-point of spreader 40. FIGS. 5-7 depict further sequential conditions in the process of applying a tubular label 28 onto a cylindrical container 32.

Referring now to FIG. 5, cylindrical container 32 continues to move in the direction of arrow A and is almost fully concentric below spreader 40. In this condition, cut sleeve 28 is advanced downward to almost contact the upper surface of cylindrical container 32. As will be understood by those skilled in the trade, mechanical motion timing allows cylindrical container 32 and cut sleeve 28 to advance and meet at the point at which their respective peripheries coincide.

Referring now to FIG. 6, cylindrical container 32 has moved to be directly below spreader 40 and cut sleeve 28 is being moved by sleeve drivers 26a and 26b (see FIG. 3) onto cylindrical container 32. At this stage, a small segment of cut sleeve 28 engages cylindrical container 32, and a larger segment of cut sleeve 28 remains on the body of spreader 40, with a large central segment of cut sleeve 28 surrounding resilient transfer members 50-56. Transfer members 50-56, together with transfer members 58-64 (see FIG. 3), serve as a skirt to keep cut sleeve 28 open and guide the assembly of cut sleeve 28 onto cylindrical container 32.

Referring now to FIG. 7, cylindrical container 32 has moved in the direction of arrow A past the coincidence with spreader 40. Transfer members 54 and 56, and opposed transfer members not seen in this view, are shown as being deflected in the direction of arrow A by contact with cylindrical container 32. In addition, shorter transfer members 50 and 52 are shown as being deflected in the direction of arrow A by contact with cut sleeve 28. A large segment of cut sleeve 28 resides around cylindrical container 32 and a small segment of cut sleeve 28 remains in contact with spreader 40. Whereas the transfer members form a flexible skirt, as cylindrical container 32 continues to move in the direction of arrow A, cut sleeve 28 will be pulled off the bottom segment of spreader 40 and continue to mount onto cylindrical container 32, initially by the momentum generated by sleeve drivers 26a and 26b (see FIG. 3), and ultimately by gravity.

In a subsequent operation, cut sleeve 28 and cylindrical container 32 are passed through a shrinking apparatus, for example a heat tunnel, as is known, to cause cut sleeve 28 to snugly wrap the periphery of cylindrical container 32.

Figure 8A:
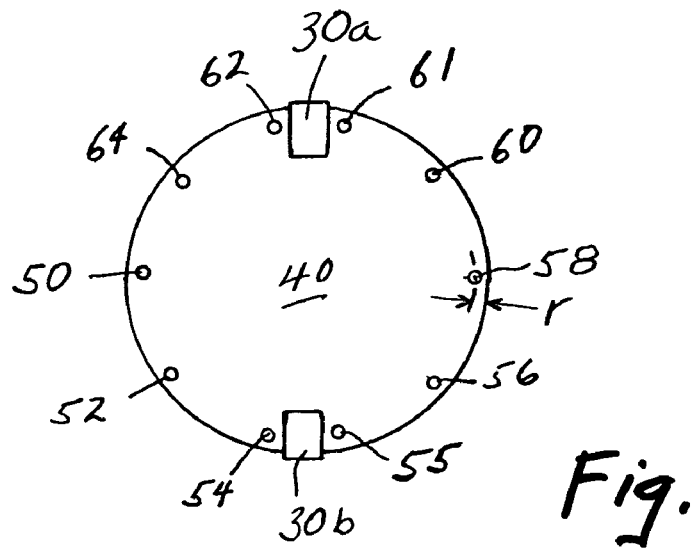
FIG. 8A is a bottom plan view of the tubular label spreader of the invention in a first embodiment.

Referring now to FIG. 8A, spreader 40 is shown in bottom plan view with transfer members 50-64 disposed in a substantially circular array around the circumference thereof. Bearings 30a and 30b are positioned opposed to one another with transfer members 61, 62 and 54, 55 situated on either side thereof. Transfer members 50-64 are depicted in the form of round wires that are assembled to the bottom surface of spreader 40 by insertion into a series of holes formed at a radial distance r from the outer edge of spreader 40. As discussed above, transfer members 50-64 can be either round or rectangular in cross section. The transfer members are assembled into respective holes by any convenient means, for example by an interference fit or with the application of an adhesive, welding or brazing.

Figure 8B:
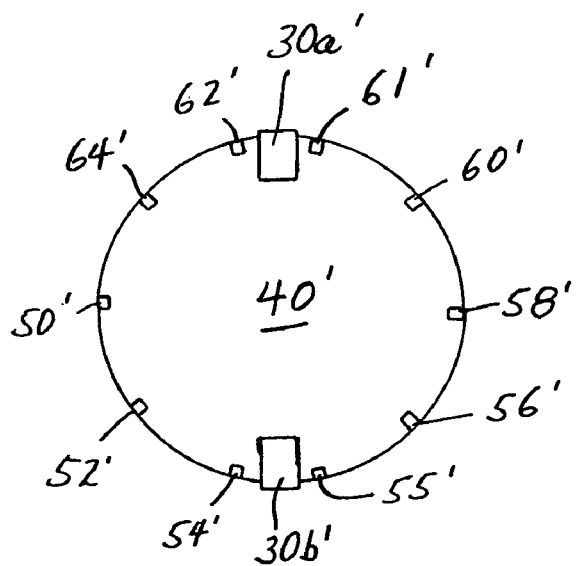
FIG. 8B is a bottom plan view of the tubular label spreader of the invention in a second embodiment.

Referring now to FIG. 8B, an alternate embodiment spreader 40' is shown in bottom plan view. Spreader 40' is formed with a series of slots cut into the circumference thereof in similar angular pattern to the holes formed in spreader 40 of FIG. 8A. Transfer members 50'-64' are mounted in respective slots. Thus, transfer members 50'-64' of FIG. 8B are positioned on a larger diameter than transfer members 50-64 of FIG. 8A. The pattern of placement and number of transfer members that may be used according to the present invention depends on several factors, including, but not restricted to, the diameter of the spreader, the length, and the rigidity of the transfer members. Bearings 30a' and 30b' are similarly situated to bearings 30a and 30b of FIG. 8A. Whereas the slots are cut rectangular in cross section, either rectangular or round transfer members 50'-64' are used. In addition to the round spreader 40 and round cylindrical container 32 shown above, other cylindrical shapes such as square cylinders or triangular cylinders are also considered to be within the scope of the invention disclosed.

While the description above discloses preferred embodiments of the present invention, it is contemplated that numerous variations and modifications of the invention are possible and are considered to be within the scope of the claims that follow.

What is claimed is:

1. Apparatus for opening a flat tubular sleeving and mounting a cut sleeve of the opened tubular sleeving on a cylindrical object being moved along a path perpendicular to an axis of the cut sleeve, comprising:
   a. a spreader having a conical first portion and a cylindrical second portion; and
   b. a skirt affixed to the cylindrical second portion for guiding the opened sleeving onto the cylindrical object, the skirt comprising a segment having a length that extends into the path of the cylindrical object such that the cylindrical object contacts the segment and deflects the segment as the cylindrical object moves along the path.

2. The apparatus described in claim 1, wherein the segment extends in a direction substantially parallel to an axis of the spreader from the second portion of the spreader to a position to contact a proximal portion of the cylindrical object.

3. The apparatus described in claim 1, wherein the segment comprises a plurality of elongated transfer members spaced apart from each other about a periphery of the cylindrical second portion.

4. The apparatus described in claim 3, wherein the transfer members comprise a plurality of wire members.

5. The apparatus described in claim 2, wherein the segment comprises a plurality of elongated transfer members spaced apart from each other about a periphery of the cylindrical second portion.

6. The apparatus described in claim 5, wherein the transfer members comprise a plurality of wire members.

7. The apparatus described in claim 1, wherein the segment is a first segment having a first length, the skirt further comprising a second segment having a second length that is shorter than the first length.

8. The apparatus described in claim 3, wherein the plurality of elongated transfer members is a first number of the transfer members having a first length, the skirt further comprising a second number of elongated transfer members having a second length that is shorter than the first length.

9. The apparatus described in claim 7, wherein the second segment is sized to remain out of contact with the cylindrical object and the first segment is sized to contact the cylindrical object.

10. The apparatus described in claim 9, wherein the first segment of the skirt is sized to contact a length of the cylindrical object substantially equal to 3.0 mm (⅛ inch).

11. The apparatus described in claim 1, wherein a length of the cylindrical second portion of the spreader plus a length of the skirt is equal to or less than a length of the cut sleeve.

12. The apparatus described in claim 1, wherein the skirt is circular in cross section.

13. Apparatus for opening a flat tubular sleeving and mounting an opened portion of the tubular sleeving on an object being moved along a path, comprising:
   a. a spreader positioned above the path, the spreader having an upper portion and a lower portion, the upper portion shaped to open the flat tubular sleeving as the flat tubular sleeving moves downward over the upper portion, the lower portion shaped to hold the tubular sleeving in open form; and
   b. a skirt extending downward from the lower portion for guiding the opened portion of the tubular sleeving onto the object, the skirt formed by a plurality of spaced apart members, wherein a first number of spaced apart members have a first length and a second number of spaced apart members have a second length that is longer than the first length.

14. The apparatus described in claim 13, wherein at least a first one of the second number of spaced apart members has a downward extending length that causes the first one member to be contacted by the object moved along the path.

15. The apparatus described in claim 14, wherein at least a second one of the first number of spaced apart members has a downward extending length that causes the object moved along the path to pass beneath the second one member without contacting the second member, wherein the second one member is positioned upstream of the first one member relative to a movement direction of the object.

16. The apparatus described in claim 13, wherein the plurality of spaced apart members are elongated transfer members spaced apart about the periphery of the lower portion, the transfer members capable of flexing relative to the lower portion of the spreader.

17. Apparatus for opening a flat tubular sleeving and mounting an opened portion of the tubular sleeving on an object being moved along a path, comprising:
   a. a spreader positioned above the path, the spreader having an upper portion and a lower portion, the upper portion shaped to open the flat tubular sleeving as the flat tubular sleeving moves downward over the upper portion, the lower portion shaped to hold the tubular sleeving in open form; and b. a skirt extending downward from the lower portion for guiding the opened portion of the tubular sleeving onto the object, the skirt having a length that contacts the object as the object is moved along the path to flex the skirt relative to the lower portion of the spreader as the object moves thereby.

18. The apparatus described in claim 17, wherein the skirt is formed by a plurality of spaced apart transfer members.

* * * * *